(12) United States Patent
Fujita et al.

(10) Patent No.: US 11,061,227 B2
(45) Date of Patent: Jul. 13, 2021

(54) DISPLAY DEVICE AND APPARATUS

(71) Applicant: RICOH COMPANY, LTD., Tokyo (JP)

(72) Inventors: Kazuhiro Fujita, Tokyo (JP); Yuuki Satoh, Kanagawa (JP); Maiko Yasui, Kanagawa (JP); Takehide Ohno, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 164 days.

(21) Appl. No.: 16/269,597

(22) Filed: Feb. 7, 2019

(65) Prior Publication Data

US 2019/0285884 A1     Sep. 19, 2019

(30) Foreign Application Priority Data

Mar. 16, 2018   (JP) .............................. JP2018-050241

(51) Int. Cl.
*G02B 27/01*     (2006.01)
*G02B 19/00*     (2006.01)
(Continued)

(52) U.S. Cl.
CPC ......... *G02B 27/0101* (2013.01); *G02B 5/208* (2013.01); *G02B 5/26* (2013.01);
(Continued)

(58) Field of Classification Search
CPC ...... G02B 27/01; G02B 27/0101; G02B 5/26; G02B 19/0019; G02B 5/20; G02B 5/208
See application file for complete search history.

(56) References Cited

U.S. PATENT DOCUMENTS

2016/0334637 A1   11/2016  Saisho et al.
2017/0075118 A1*   3/2017  Wall ...................... G02B 27/01
(Continued)

FOREIGN PATENT DOCUMENTS

JP        2003-344801        12/2003
JP        2004-347633 A      12/2004
(Continued)

OTHER PUBLICATIONS

European Search Report dated Aug. 22, 2019, issued in corresponding European Patent Application No. 19153577.2.

*Primary Examiner* — Ephrem Z Mebrahtu
(74) *Attorney, Agent, or Firm* — Xsensus LLP

(57) ABSTRACT

A display device includes an image forming unit to form an image and project the image on a transmissive reflector to display a virtual image, an optical element to direct light of the image to the transmissive reflector, a wavelength selective mirror disposed between the image forming unit and the optical element and to separate infrared light from a light beam, and a shielding part to shield or attenuate infrared light. The optical element condenses external light travelling along an optical path opposite to an optical path of the light diffused. The wavelength selective mirror separates infrared light included in the external light condensed by the optical element, and the shielding part is disposed between the wavelength selective mirror and a focal point of the infrared light separated by the wavelength selective mirror. An apparatus includes the display device and the transmissive reflector.

20 Claims, 5 Drawing Sheets

(51) Int. Cl.
 *G02B 5/20* (2006.01)
 *G02B 5/26* (2006.01)
(52) U.S. Cl.
 CPC .... *G02B 19/0019* (2013.01); *G02B 2027/011* (2013.01); *G02B 2027/0118* (2013.01)

(56) References Cited

U.S. PATENT DOCUMENTS

| | | | |
|---|---|---|---|
| 2018/0210199 A1* | 7/2018 | Yokoe | G02B 27/0101 |
| 2018/0252916 A1 | 9/2018 | Nakamura et al. | |
| 2018/0267306 A1 | 9/2018 | Nakamura et al. | |
| 2019/0162961 A1* | 5/2019 | Yokoe | B60K 35/00 |
| 2019/0227308 A1* | 7/2019 | Yokoe | G02B 5/282 |
| 2020/0189363 A1* | 6/2020 | Sugiyama | G02B 5/3025 |

FOREIGN PATENT DOCUMENTS

| | | |
|---|---|---|
| JP | 2004347633 A * | 12/2004 |
| JP | 2014-074802 | 4/2014 |
| JP | 2017-009855 | 1/2017 |
| JP | 2017-044858 | 3/2017 |
| JP | 2018-010138 | 1/2018 |
| JP | 2018-022102 A | 2/2018 |
| WO | 2018/062302 A1 | 4/2018 |

* cited by examiner

DISPLAY DEVICE AND APPARATUS

CROSS-REFERENCE TO RELATED APPLICATION

This patent application is based on and claims priority pursuant to 35 U.S.C. § 119(a) to Japanese Patent Application No. 2018-050241, filed on Mar. 16, 2018, in the Japan Patent Office, the entire disclosure of which is hereby incorporated by reference herein.

BACKGROUND

Technical Field

Embodiments of the present disclosure relate to a display device and an apparatus.

Background Art

There has been used a display device such as a heads-up display (HUD) that enables an observer (a driver) to recognize various information (for example, speed information, traffic information, navigation information, warning information, and the like) with less line-of-sight movements in a mobile object such as a vehicle. Such a display device commonly projects an original image formed on a screen by laser scanning on a transmissive reflector such as a windshield, thus displaying a virtual image that can be visually recognized by the observer.

A configuration of a vehicle HUD is disclosed, in which a cold mirror that reflects visible light and transmits infrared light is disposed on an optical path of external light (sunlight) incident on a display device for the purpose of reducing the influence of external light. In addition, a configuration is disclosed, in which a member of reducing an infrared component is disposed between a screen (a liquid crystal panel) on which an original image is formed and a concave mirror that projects light emitted from the screen on a windshield.

SUMMARY

Embodiments of the present disclosure described herein provide a display device and an apparatus. The display device includes an image forming unit to form an image and project the image on a transmissive reflector to display a virtual image, an optical element to direct light of the image to the transmissive reflector, a wavelength selective mirror disposed between the image forming unit and the optical element and to separate infrared light from a light beam, and a shielding part to shield or attenuate infrared light. The optical element condenses external light travelling along an optical path opposite to an optical path of the light diffused. The wavelength selective mirror separates infrared light included in the external light condensed by the optical element, and the shielding part is disposed between the wavelength selective mirror and a focal point of the infrared light separated by the wavelength selective mirror. The apparatus includes the display device and the transmissive reflector.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
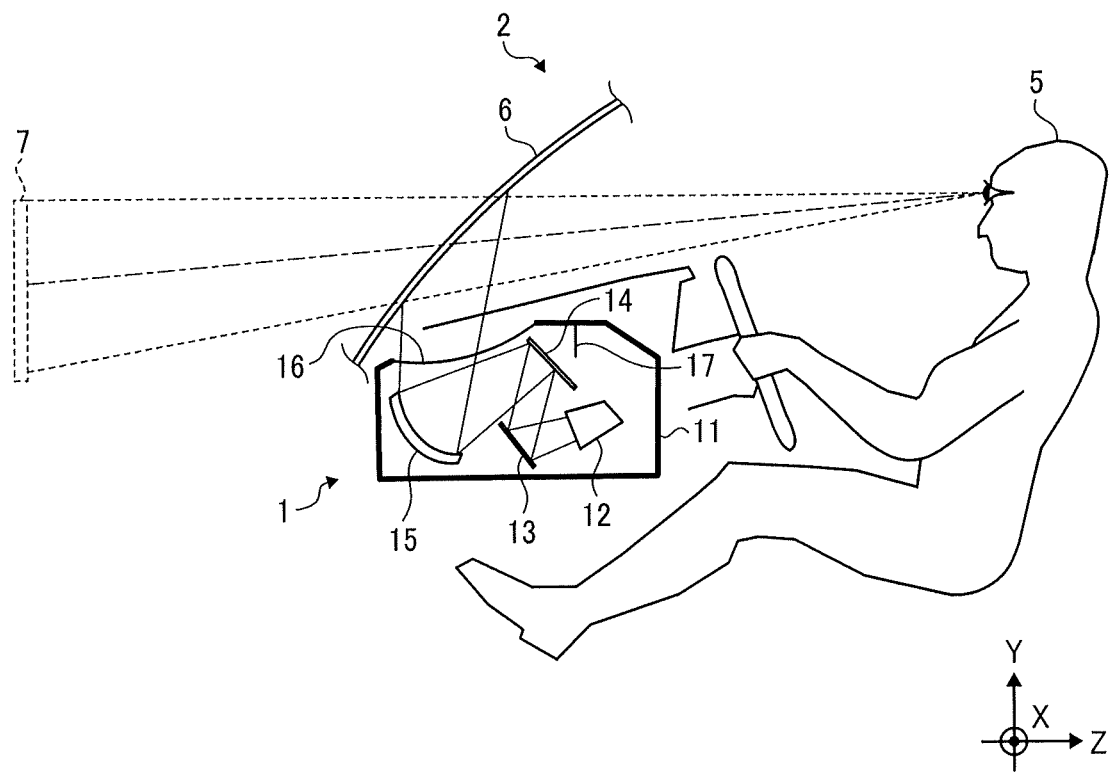
FIG. 1 is a view illustrating an overall configuration example of an apparatus on which a display device according to a first embodiment is mounted.

The accompanying drawings are intended to depict embodiments of the present disclosure and should not be interpreted to limit the scope thereof. The accompanying drawings are not to be considered as drawn to scale unless explicitly noted.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of a display device and an apparatus will be described hereinafter in detail with reference to the accompanying drawings. The present invention is not limited by the following embodiments, and constituent elements in the following embodiments include those that can be easily conceived by those skilled in the art, those that are substantially the same, and those within the so-called equivalent scope of the invention. Various omissions, substitutions, changes, and combinations of constituent elements can be made without departing from the subject of the following embodiments.

First Embodiment

FIG. 1 is a view illustrating an overall configuration example of an apparatus 2 on which a display device 1 according to a first embodiment is mounted.

The display device 1 according to the present embodiment is a HUD mounted on the apparatus 2. The apparatus 2 may be a mobile object such as a vehicle, an aircraft, and a vessel or an immobile object such as a steering simulation system and a home theater system. A HUD (an example of the display device 1) mounted on a vehicle (an example of the apparatus 2) will be described as an example.

The display device 1 displays a virtual image 7 that can be visually recognized by an observer (a vehicle's driver) 5 through a windshield 6 (transmissive reflector). The display device 1 includes a casing 11, an image forming unit 12 (image forming unit), a total reflection mirror 13, a cold mirror 14 (wavelength selective mirror), a concave mirror 15, a dustproof sheet 16, and a shielding part 17. An X axis corresponds to a width direction of the apparatus 2, a Y axis corresponds to a vertical direction of the apparatus 2, and a Z axis corresponds to a front-rear direction of the apparatus 2.

The casing 11 is a member that constitutes an outer frame of the display device 1 and houses components such as the image forming unit 12, the total reflection mirror 13, the cold mirror 14, the concave mirror 15, and the shielding part 17. While the material and shape of the casing 11 should be appropriately selected according to use conditions, resins that are excellent in solidity, heat resistance, light-weight property, moldability, and the like can be used.

The image forming unit 12 includes a mechanism for forming an image (original image) that is the source of the virtual image 7. A specific configuration of the image forming unit 12 will be described later.

The total reflection mirror 13 reflects light beams including visible light and infrared light. The cold mirror 14 reflects visible light and transmits infrared light. The total reflection mirror 13 reflects light (i.e., the light of an original image) emitted from the image forming unit 12 to the cold mirror 14. The cold mirror 14 reflects a visible light component of light emitted from the total reflection mirror 13 to the concave mirror 15. While FIG. 1 illustrates the configuration in which light emitted from the image forming unit 12 is irradiated to the cold mirror 14 via the total reflection mirror 13, the present invention is not limited to the configuration. For example, the cold mirror 14 may be directly irradiated with light emitted from the image forming unit 12, or more mirrors may be interposed between the image forming unit 12 and the cold mirror 14.

The concave mirror 15 reflects the light (i.e., the visible light of an original image) emitted from the cold mirror 14 to the windshield 6. The concave mirror 15 has a curved shape according to the curvature of the windshield 6, that is, such that the virtual image 7 is visually recognized by the observer 5 without any distortion. The concave mirror 15 may be configured to be displaceable by an appropriate drive mechanism. It is thus possible to adjust the display position of the virtual image 7 and perform distortion correction on the virtual image 7.

The present embodiment describes the concave mirror 15 as an optical system having a function necessary for allowing the observer 5 to visually recognize the virtual image 7. However, it is only required that the optical system having a function necessary for allowing the observer 5 to visually recognize the virtual image 7 includes a light condensing function. While the present embodiment describes an example of using the concave mirror 15, other optical elements having an identical function to the concave mirror 15 may be used. For example, a transmissive lens element, a Fresnel lens, a Fresnel reflective element, and a diffraction grating can be used.

In most cases, the concave mirror 15 according to the present embodiment, which is an example of an optical element for directing light to the windshield 6, is obtained by forming a metal thin film of aluminum, silver, or the like on a surface of a resin member, a glass member, or the like by vapor deposition, sputtering, or the like, for the purpose of maximizing light use efficiency. For this reason, the reflectance in the wavelength distribution (from the ultraviolet region of 300 nm to the near-infrared region of 800 nm to 2500 nm) of external light such as sunlight is also high. Infrared light that is reflected by the concave mirror 15 and transmitted through the cold mirror 14 is thus condensed somewhere on an optical path and causes a temperature rise at a focal point.

The dustproof sheet 16 is a translucent member that prevents dust from entering the display device 1. Light that constitutes an original image and is reflected by the concave mirror 15 is irradiated to the windshield 6 through the dustproof sheet 16.

The shielding part 17 is a member that shields or attenuates infrared light having transmitted through the cold mirror 14. The shielding part 17 will be described later in detail.

Figure 2:
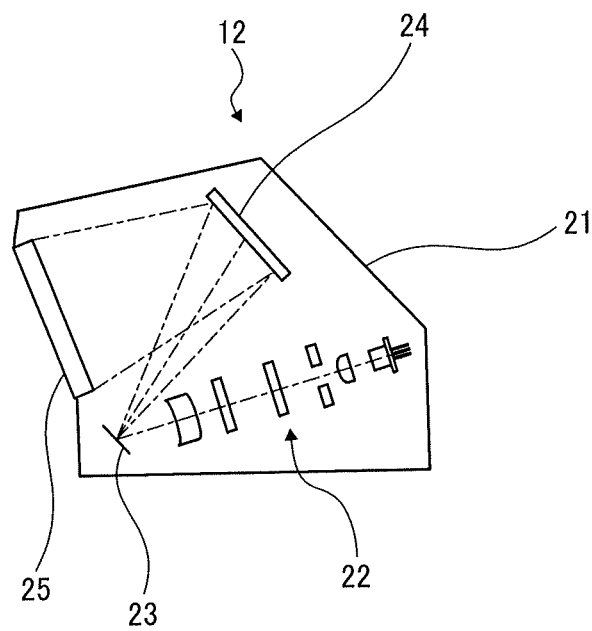
FIG. 2 is a view illustrating a configuration example of an image forming unit according to the first embodiment.

FIG. 2 is a view illustrating a configuration example of the image forming unit 12 according to the first embodiment.

The image forming unit 12 includes a casing 21, a light emitter 22, a scanning unit 23, a deflection mirror 24, and a screen 25.

The casing 21 is a member that constitutes an outer frame of the image forming unit 12 and houses components such as the light emitter 22, the scanning unit 23, the deflection mirror 24, and the screen 25. While the material and shape of the casing 21 should be appropriately selected according to use conditions, resins that are excellent in solidity, heat resistance, light-weight property, moldability, and the like can be used. The light emitter 22 is a mechanism that emits laser light and is constituted by, for example, a light source element, a condensing optical system, a collimating optical system, and a diffusion optical system. The scanning unit 23 is a mechanism that changes a traveling direction of laser light emitted from the light emitter 22, and is constituted by, for example, a micro electro mechanical systems (MEMS) mirror and a circuit (a microprocessor, a logic circuit, or the like) for controlling an operation of the MEMS mirror. The deflection mirror 24 reflects laser light emitted from the scanning unit 23. The screen 25 is an optical element that receives laser light emitted from the deflection mirror 24. While the specific configuration of the screen 25 should be appropriately selected according to use conditions and the like, the screen 25 may be constituted by, for example, a micro lens array. The scanning unit 23 functions to scan the screen 25 with laser light. By controlling operations of the light emitter 22 and the scanning unit 23 according to the configuration of the virtual image 7 including desired information, an original image is formed on the screen 25. As the deflection mirror 24 is disposed mainly for downsizing the image forming unit 12 (the casing 21), the image forming unit 12 may be configured without the deflection mirror 24, that is, may be configured that laser light emitted from the scanning unit 23 directly scans the screen 25.

Figure 3:
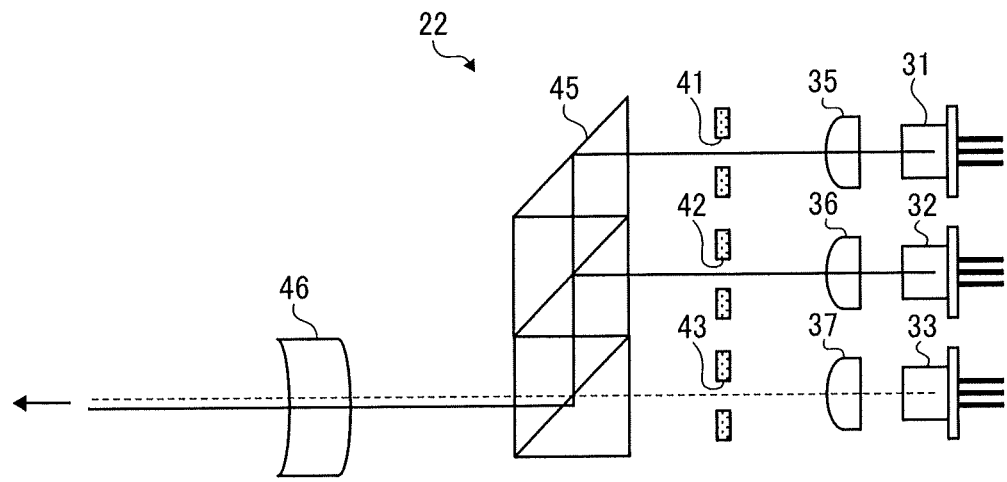
FIG. 3 is a view illustrating a configuration example of a light emitter according to the first embodiment.

FIG. 3 is a view illustrating a configuration example of the light emitter 22 according to the first embodiment.

The light emitter 22 according to this example includes LDs (semiconductor laser elements) 31, 32, and 33, coupling lenses 35, 36, and 37, apertures 41, 42, and 43, a combining element 45, and a meniscus lens 46.

The LDs 31, 32, 33 emit light beams having different wavelengths (for example, 640 nm, 530 nm, and 445 nm).

The light beams emitted from the LDs 31, 32, and 33 are coupled to subsequent optical systems by the corresponding coupling lenses 35, 36, and 37. The light beams emitted from the coupling lenses 35, 36, and 37 are shaped by the corresponding apertures 41, 42, and 43. While the shape of the apertures 41, 42, and 43 should be appropriately selected according to use conditions (the divergence angle of a light beam or the like), the shape may be, for example, a circle, an ellipse, a rectangle, or a square. The light beams emitted from the apertures 41, 42, and 43 pass through the combining element 45 to be combined into one light beam that travels along one optical path. While the specific configuration of the combining element 45 should be appropriately selected according to use conditions, the combining element 45 may be, for example, a plate-like or prismatic dichroic mirror. In this case, the combining element reflects or transmits each light beam based on the wavelength, and combines the optical paths of the light beams into one optical path. The meniscus lens 46 is disposed so that a surface facing the scanning unit 23 is a concave surface. The light beam combined by the combining element 45 to travel along one optical path is guided to the scanning unit 23 through the meniscus lens 46.

Figure 4:
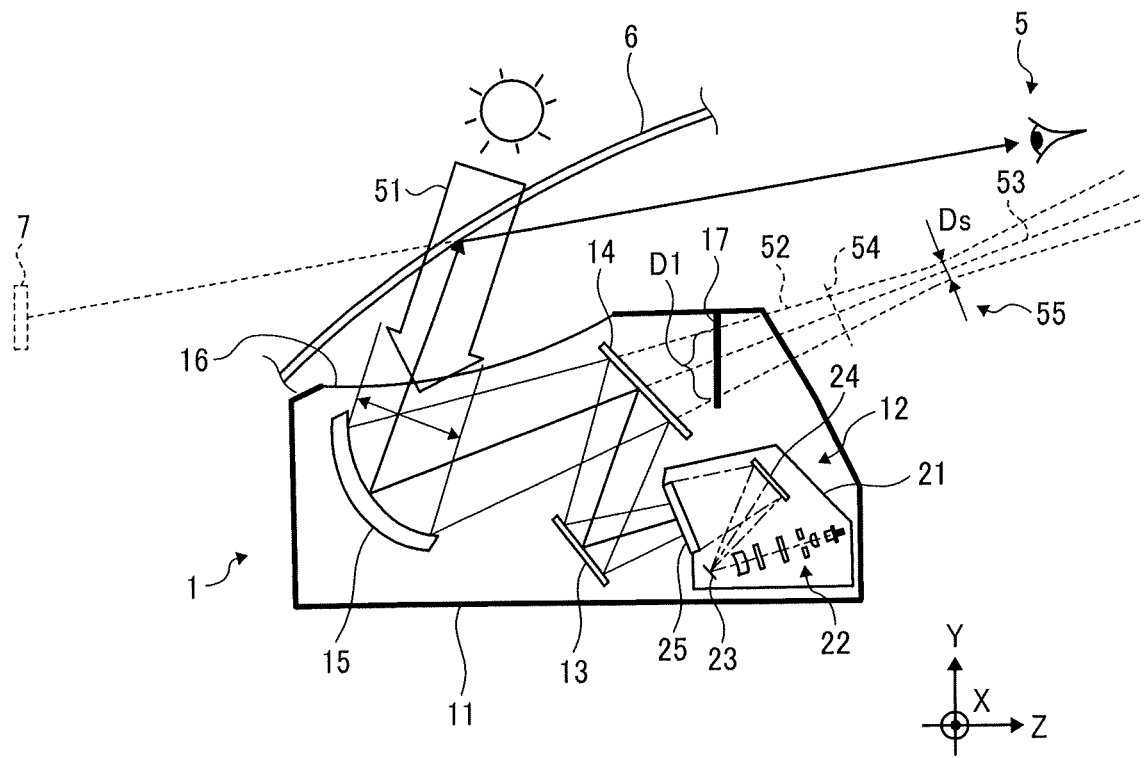
FIG. 4 is a view illustrating a configuration example of the display device according to the first embodiment.

FIG. 4 is a view illustrating a configuration example of the display device 1 according to the first embodiment.

As the light of an original image formed by the image forming unit 12 is projected on the windshield 6 through the total reflection mirror 13, the cold mirror 14, and the concave mirror 15, the observer 5 can visually recognize the virtual image 7 through the windshield 6. The display device 1 according to the present embodiment has a so-called "vertical installation type" configuration. The image forming unit 12, the total reflection mirror 13, the cold mirror 14, and the concave mirror 15 are arranged so that the optical path of light that is emitted from the screen 25 of the image forming unit 12 and reaches the windshield 6 is placed on a substantially vertical surface (a YZ plane).

When entering the casing 11 of the display device 1 through the windshield 6 and the dustproof sheet 16, external light 51 including sunlight and the like is reflected by the concave mirror 15 to be irradiated to the cold mirror 14. At this time, infrared light 52 included in the external light 51 transmits through the cold mirror 14. As the concave mirror 15 is curved according to the curvature of the windshield 6, the concave mirror 15 has a light condensing effect on light reflected from the windshield 6 to the cold mirror 14. Consequently, the infrared light 52 that is reflected by the concave mirror 15 to transmit through the cold mirror 14 is condensed on the rear side of the cold mirror 14. That is, a focal point 55 where a diameter DS of a light beam of the infrared light 52 is minimized appears on the optical path of the infrared light 52 extending to the rear side of the cold mirror 14. The temperature rises at the focal point 55. If there is a certain component (an optical system, an electronic device, a casing member, or the like) at the focal point 55, the component may be damaged. Note that the focal point 55 is a virtual focal point and can be specified only when the shielding part 17 and the casing 11 are not present.

The shielding part 17 according to the present embodiment is a member that has a function of shielding or attenuating the infrared light 52 and is disposed between the cold mirror 14 and the focal point 55. The material and shape of the shielding part 17 should be appropriately selected according to use conditions. The shielding part 17 may be formed of a known or new material having a function of shielding or attenuating infrared light such as indium tin oxide and antimony tin oxide. The entire casing 11 may be formed of a material having the function of shielding or attenuating infrared light, and by partially extending the casing 11, the shielding part 17 may be formed. The shielding part 17 may be integrated with the casing 11 or may be detachable from an appropriate component such as the casing 11. In addition, the shielding part 17 may have a shape (for example, a plate shape or the like) capable of shielding all of the infrared light 52 transmitted through the cold mirror 14, or may have a shape (for example, a strip shape, a mesh shape or the like) capable of partially shielding the infrared light 52. The shielding part 17 may have any shape capable of at least attenuating the energy of the infrared light 52.

The material and shape of the shielding part 17 are not limited to the materials and shapes described above. For example, the casing 11 may be formed of a metal and the shielding part 17 may be formed as a part of the casing 11. Alternatively, the casing 11 may be formed of a resin and the shielding part 17 may be formed as a part of the casing 11. For example, when the focal point 55 is located at a position separated from the shielding part 17 by a predetermined distance (for example, a distance at which the infrared light 52 is less likely to damage a component) or longer, the casing 11 and the shielding part 17 are preferably formed of a resin in view of moldability, light-weight property, and the like. The resin used for the casing 11 and the shielding part 17 may be, for example, a crystalline heat-resistant polymer. More specifically, it is possible to use engineering plastics such as polybutylene terephthalate (PBT), polyethylene terephthalate (PET), polyacetal (POM), polyamide (PA), polycarbonate (PC), modified polyphenylene ether (m-PPE). In particular, it is preferable to use polybutylene terephthalate (PBT), polyphenylene sulfide (PPS), and polyethylene terephthalate (PET) because these heat-resistant polymers have a high melting point.

While the energy of the infrared light 52 depends on the weather, the solar altitude, and the like, the energy is considered to be approximately 60% of the sunlight energy immediately below the equator, which is approximately 1100 W/m2, at most. The energy density at the focal point 55 depends on the amount of the external light 51 taken in by the concave mirror 15. Assuming that the ratio of the area S of the concave mirror 15 that receives light to the area s of the focal point 55 condensed by the concave mirror 15 (S/s) is defined as a condensing magnification, when the condensing magnification is larger than or equal to 10, the irradiation density at the focal point 55 is estimated to be larger than or equal to 6600 W/m2. At the focal point 55 with the irradiation density described above, there is a possibility of a large temperature rise. For this reason, the condensing magnification is as small as possible, preferably less than 10. The condensing magnification changes depending on characteristics of members on the optical path of the external light 51 (in this example, the transmittance of the windshield 6 or the dustproof sheet 16, the reflectance of the concave mirror 15, and the like). If the condensing magnification is less than 10, it is less necessary to use a special material as the shielding part 17 or to perform a surface treatment for the shielding part 17, and thus the casing 11 and the shielding part 17 can be formed using, for example, a resin having good moldability.

Preferably, the light receiving surface of the shielding part 17 is not perpendicular to a light beam center 53 (the optical path) of the infrared light 52 transmitted through the cold mirror 14, that is, is inclined to a vertical plane 54 of the light beam center 53 by a predetermined angle or more. It is thus possible to increase the diameter D1 of the light receiving area in the shielding part 17 and to improve an effect of shielding or attenuating the infrared light 52. The diameter D1 is larger than the diameter DS of the light beam of the infrared light 52 at the focal point 55. The light receiving surface of the shielding part 17 according to the present embodiment is inclined to a reflecting surface of the cold mirror 14 by a predetermined angle or more. The position of the focal point 55, the diameters D1 and DS, and the like can be estimated based on the curvature of the concave mirror 15, the relative positions of the concave mirror 15 and the cold mirror 14, and the like.

As described above, by disposing the shielding part 17 between the cold mirror 14 and the focal point 55, the infrared light 52 transmitted through the cold mirror 14 can be shielded or attenuated to prevent the focal point 55 from being formed or to reduce the energy at the focal point 55. It is thus possible to reliably prevent failures due to the external light 51.

Hereinafter, other embodiments will be described with reference to the drawings. Parts having the same or identical operations and effects as those of the first embodiment are denoted by the same reference numerals and descriptions thereof may be omitted.

Second Embodiment

Figure 5:
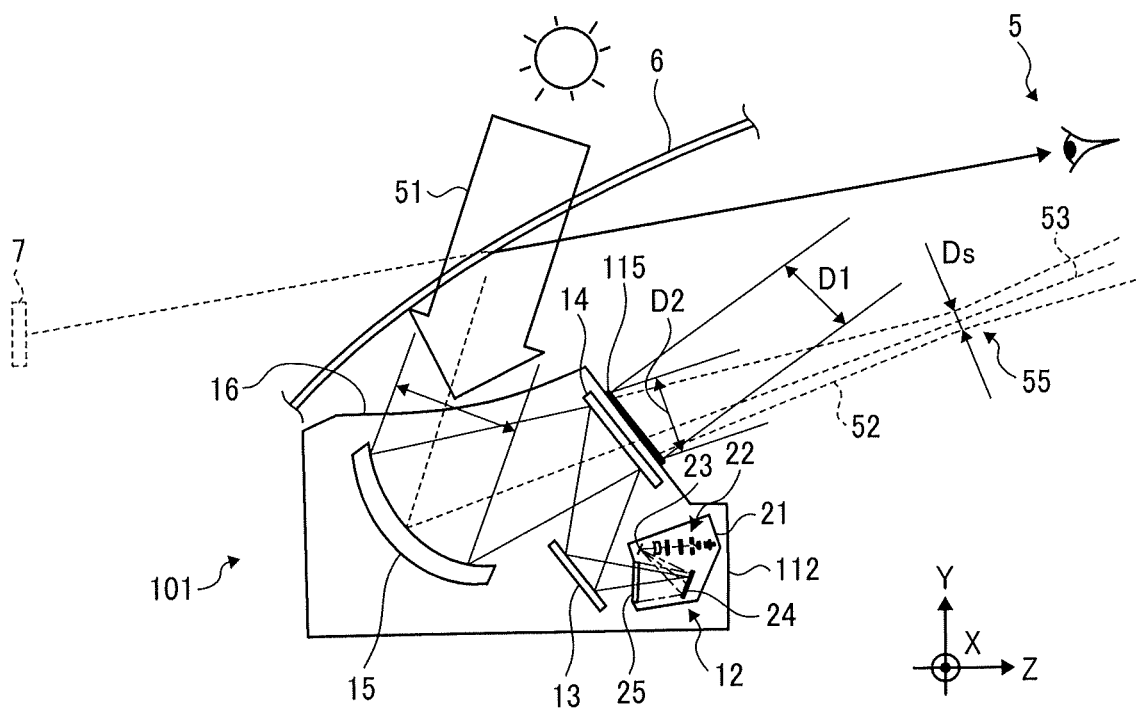
FIG. 5 is a view illustrating a configuration example of a display device according to a second embodiment.

FIG. 5 is a view illustrating a configuration example of a display device 101 according to a second embodiment.

The present embodiment is different from the first embodiment in that the reflecting surface of the cold mirror 14 is substantially parallel to the light receiving surface of a shielding part 115 and that a casing 112 is shaped to be adjacent to the cold mirror 14. At this time, the diameter D1 of a light receiving area of the shielding part 115 is larger than a diameter D2 of a light receiving area assumed to be perpendicular to the light beam center 53.

In addition, the shielding part 115 according to the present embodiment is disposed at a position closer to the concave mirror 15 than the shielding part 17 according to the first embodiment. The diameter D1 of the light receiving area of the shielding part 115 is thus larger than that of the shielding part 17 according to the first embodiment, and the irradiation density of the infrared light 52 is smaller than that of the first embodiment. It is thus possible to form the shielding part 115 using a part of the casing 11 without using a special material for the shielding part 115.

The present embodiment is similar to the first embodiment in that the light receiving surface of the shielding part 115 is not perpendicular to the light beam center 53 of the infrared light 52 and the diameter D1 is larger than the diameter DS of the light beam at the focal point 55.

According to the present embodiment, the infrared light 52 transmitted through the cold mirror 14 can be shielded or attenuated to reliably prevent failures due to the external light 51 and the display device 101 can be downsized, as in the first embodiment. Further, it is possible to prevent the focal point 55 from being inside of the casing 11. Consequently, if foreign matter such as dust enters the casing 11, it is possible to reliably prevent the foreign matter from being heated by the focal point 55.

Third Embodiment

Figure 6:
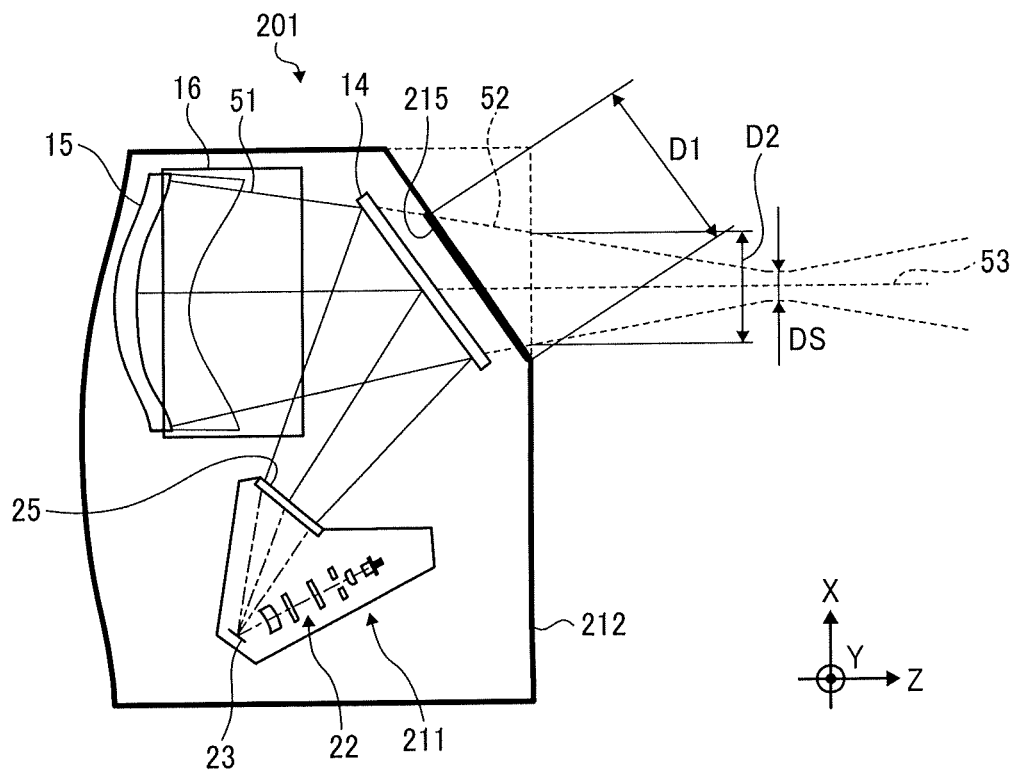
FIG. 6 is a view illustrating a configuration example of a display device according to a third embodiment.

FIG. 6 is a view illustrating a configuration example of a display device 201 according to a third embodiment.

The display device 201 according to the present embodiment includes an image forming unit 211, the cold mirror 14, the concave mirror 15, and a shielding part 215, and has a so-called "horizontal installation type" configuration. The image forming unit 211, the cold mirror 14, and the concave mirror 15 according to the present embodiment are arranged so that light travelling from the screen 25 of the image forming unit 211 to the cold mirror 14 is placed on a substantially horizontal surface (an XZ plane) and light travelling from the concave mirror 15 to the windshield 6 is placed on the substantially vertical surface (the YZ plane).

The image forming unit 211 according to the present embodiment forms an original image similarly to the image forming unit 12 according to the first embodiment, and includes the light emitter 22, the scanning unit 23, and the screen 25. The image forming unit 211 is different from the image forming unit 12 in that the image forming unit 211 does not include the deflection mirror 24. In addition, the display device 201 according to the present embodiment does not have a component corresponding to the total reflection mirror 13 according to the first embodiment, and light emitted from the screen 25 is directly irradiated to the cold mirror 14.

In the present embodiment, the light receiving surface of the shielding part 215 is substantially parallel to the reflecting surface of the cold mirror 14. Further, a casing 212 of the display device 201 is shaped to be adjacent to the cold mirror 14. In this case, the diameter D1 is larger than the diameter DS of a light beam at the focal point 55 and the diameter D2 of a light receiving area assumed to be perpendicular to the light beam center 53.

According to the present embodiment, in the so-called "horizontal installation type" display device 201, the infrared light 52 transmitted through the cold mirror 14 can be shield or attenuated to reliably prevent failures due to the external light 51 and the display device 201 can be downsized.

Fourth Embodiment

Figure 7:
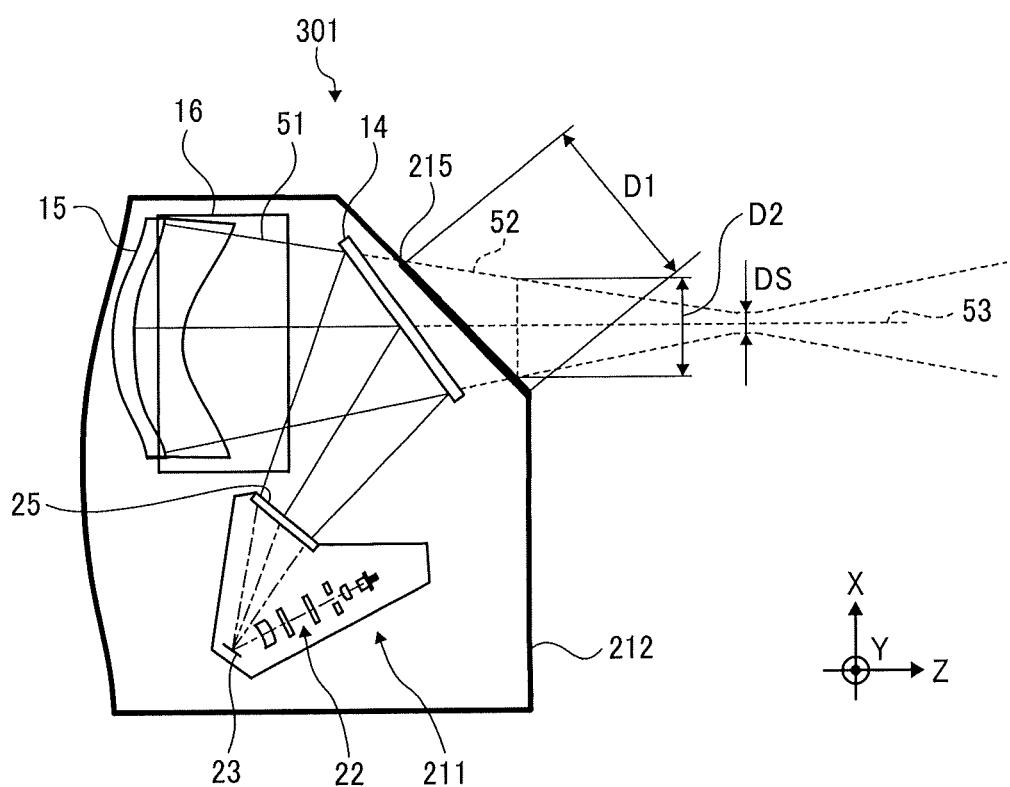
FIG. 7 is a view illustrating a configuration example of a display device according to a fourth embodiment.

FIG. 7 is a view illustrating a configuration example of a display device 301 according to a fourth embodiment.

The display device 301 according to the present embodiment is different from that of the third embodiment in that the light receiving surface of the shielding part 215 is inclined to the reflecting surface of the cold mirror 14 by a predetermined angle or more. The diameter D1 of a light receiving area of the shielding part 215 is larger than the diameter DS of a light beam at the focal point 55 and the diameter D2 of a light receiving area assumed to be perpendicular to the light beam center 53.

With such a configuration, similar effects as those of the third embodiment can be achieved.

Fifth Embodiment

Figure 8:
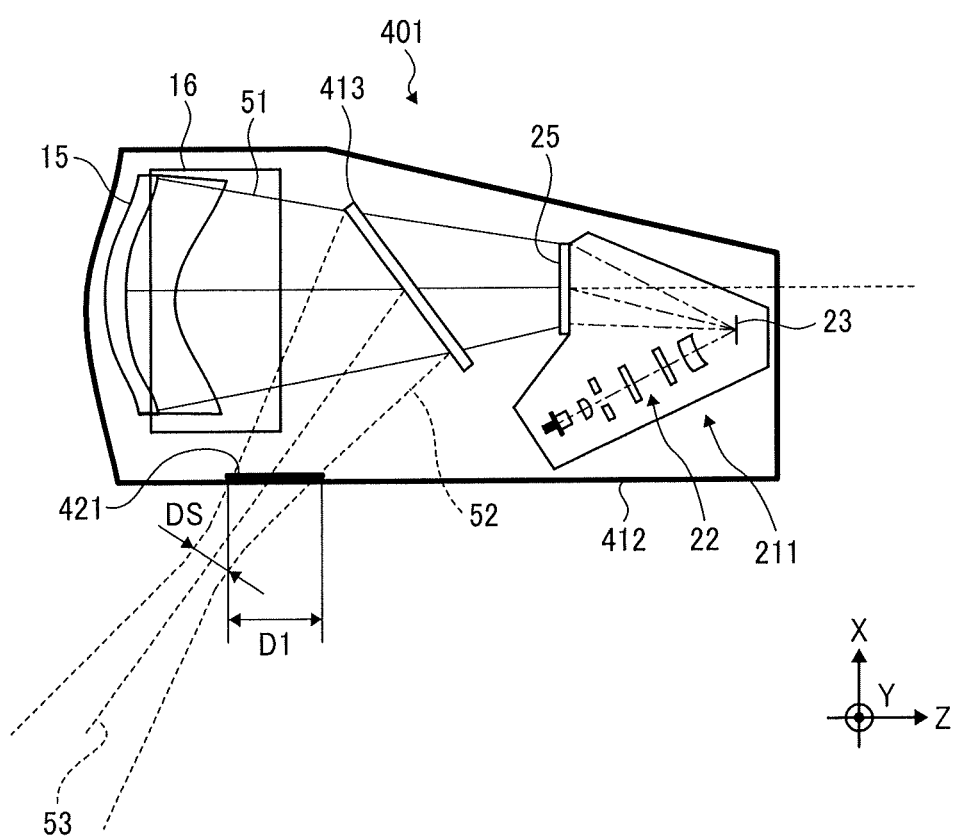
FIG. 8 is a view illustrating a configuration example of a display device according to a fifth embodiment.

FIG. 8 is a view illustrating a configuration example of a display device 401 according to a fifth embodiment.

The display device 401 according to the present embodiment includes a hot mirror 413 (wavelength selective mirror) that reflects infrared light and transmits visible light and a shielding part 421 that shields or attenuates the infrared light 52 reflected by the hot mirror 413.

Light emitted from the screen 25 of the image forming unit 211 is transmitted through the hot mirror 413 to be irradiated to the concave mirror 15. The infrared light 52 included in the external light 51 entering from above and reflected by the concave mirror 15 is reflected by the hot mirror 413. The shielding part 421 is disposed between the hot mirror 413 and the focal point 55 of the infrared light 52. While the present embodiment exemplifies a configuration in which the shielding part 421 is provided on an inner wall surface of a casing 412, the position and shape of the shielding part 421 are not limited the position and shape described above and should be appropriately selected according to use conditions. The diameter D1 of a light receiving area of the shielding part 421 is larger than the diameter DS of a light beam at the focal point 55 of the infrared light 52.

According to the configuration described above, it is possible to prevent the infrared light 52 included in the external light 51 from being condensed at the position where the image forming unit 211 and other components are disposed and to shield or attenuate the infrared light 52 reflected by the hot mirror 413, thus reliably preventing failures due to the external light 51.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

What is claimed is:

1. A display device, comprising:
   an image former configured to form an image and project the image on a transmissive reflector to display a virtual image;
   a first mirror configured to direct light of the image to the transmissive reflector;
   a wavelength selective mirror disposed between the image former and the first mirror, the wavelength selective mirror configured to separate infrared light from visible light; and
   a shield configured to shield or attenuate the infrared light, wherein
   a diameter of a light receiving area of the shield is larger than a diameter of the infrared light at a focal point of the infrared light,
   a condensing magnification of a light receiving area of the first mirror with respect to an area of a focal point of the visible light received by the first mirror is less than 10,
   the first mirror condenses external light travelling along an optical path in an opposite direction to an optical path of the light of the image,
   the infrared light is included in the external light condensed by the first mirror,
   the wavelength selective mirror separates the infrared light from visible light of the external light, and
   the shield is disposed between the wavelength selective mirror and the focal point of the infrared light.

2. The display device according to claim 1, wherein the first mirror is a concave mirror that reflects the light of the image to the transmissive reflector.

3. The display device according to claim 1, wherein the light receiving surface of the shield is inclined to a vertical surface of an optical path of the infrared light separated by the wavelength selective mirror by a predetermined angle or more.

4. The display device according to claim 1, wherein the light receiving surface of the shield is parallel to a reflecting surface of the wavelength selective mirror.

5. The display device according to claim 1, wherein the diameter of the light receiving area of the shield for the infrared light separated by the wavelength selective mirror is larger than a diameter where the light receiving area is assumed to be perpendicular to an optical path of the infrared light separated by the wavelength selective mirror.

6. The display device according to claim 1, wherein the image former, the wavelength selective mirror, and the first mirror are arranged to place light, traveling from the image former to the wavelength selective mirror, on a horizontal plane.

7. The display device according to claim 1, wherein the wavelength selective mirror reflects visible light and transmits infrared light.

8. The display device according to claim 1, wherein the wavelength selective mirror reflects infrared light and transmits visible light.

9. An apparatus comprising:
   the display device according to claim 1; and
   the transmissive reflector.

10. The apparatus according to claim 9, wherein a reflecting surface of the transmissive reflector is a curved surface.

11. The display device according to claim 1, wherein a reflecting surface of the transmissive reflector is a curved surface.

12. The display device according to claim 1, wherein the light receiving surface of the shield is perpendicular to an optical path of the infrared light.

13. The display device according to claim 1, wherein along a first axis, the image former is between the shield and the first mirror.

14. The display device according to claim 1, wherein along a first axis, the first mirror is between the image former and the shield.

15. The display device according to claim 1, wherein along a first axis, the shield is between the transmissive reflector and the first mirror.

16. A display device, comprising:
    an image projection device confirmed to form an image and project the image on a display surface;
    a first mirror configured to direct light of the image to the display surface;
    a wavelength selective mirror disposed between the image projection device and the first mirror, the wavelength selective mirror configured to separate infrared light from visible light; and
    a shield configured to shield or attenuate the infrared light, wherein
    a diameter of a light receiving area of the shield is larger than a diameter of the infrared light at a focal point of the infrared light,
    a condensing magnification of a light receiving area of the first mirror with respect to an area of a focal point of the visible light received by the first mirror is less than 10,
    the first mirror condenses external light travelling along an optical path in an opposite direction to an optical path of the light of the image,
    the infrared light is included in the external light condensed by the first mirror,
    the wavelength selective mirror separates the infrared light from visible light of the external light, and
    the shield is disposed between the wavelength selective mirror and the focal point of the infrared light.

17. The display device according to claim 16, wherein the first mirror is a concave mirror that reflects the light of the image to the display surface.

18. The display device according to claim 16, wherein the light receiving surface of the shield is inclined to a vertical surface of an optical path of the infrared light separated by the wavelength selective mirror by a predetermined angle or more.

19. The display device according to claim 16, wherein a diameter of a light receiving area of the shield for the infrared light separated by the wavelength selective mirror is larger than a diameter where the light receiving area is assumed to be perpendicular to an optical path of the infrared light separated by the wavelength selective mirror.

20. The display device according to claim 16, wherein the image projection device, the wavelength selective mirror, and the first mirror are arranged to place light, traveling from the image projection device to the wavelength selective mirror, on a horizontal plane.

* * * * *